Patented Dec. 31, 1929

1,741,773

UNITED STATES PATENT OFFICE

CARL HORIX, OF CHICAGO, ILLINOIS

BEVERAGE AND PROCESS OF PREPARING THE SAME

No Drawing.    Application filed August 21, 1925.    Serial No. 51,629.

This invention relates to a beverage prepared from the yerba maté plant (*Ilex paraguariensis*) and has for one of its objects the provision of said beverage in such form that it will retain the properties of the freshly brewed infusion and yet may be kept indefinitely without deterioration.

A further object is to provide a beverage from the plant named which shall have improved and attractive appearance and a pleasing flavor.

In the following specification I have described, by way of example, the best method now known to me for preparing the beverage, the invention being more particularly defined in the appended claims.

The plant from which the beverage is made is a native of South America and has the botanical name *Ilex paraguariensis*, sometimes spelled *Ilex paraguayensis*. In Spanish South America it is known as yerba maté and in Brazil as herva matte. The leaves and leaf stems of the plant are roasted preferably by the fumes from the wood of the plant itself. The natives prepare a beverage by pouring hot water on the leaves thus prepared and drink the infusion while it is freshly made. When exposed to the air the beverage will spoil in a few hours so that as heretofore made it must be prepared fresh each time it is used. The beverage has many beneficial qualities, its most notable effect perhaps being the relief of fatigue. The natives of South America are enabled to perform prolonged arduous tasks with very little or no food if provided with the maté drink. As heretofore prepared in South America it does not appeal to the taste of the average European or North American, although its use has recently been growing in Europe.

The present invention while retaining the desirable qualities of the drink presents it in a more palatable form so that it will be attractive to the North American public. The beverage does not accelerate the action of the heart, but it counteracts fatigue and stimulates the muscles and the brain. It promotes a healthy condition of the bowels and is therefore conducive to good digestion. It stimulates the vital functions and gives a general tone-up to the system. It does not cause insomnia and has no deleterious after effects. It is superior to tea, coffee, or alcoholic beverages and readily displaces the use of beverages containing alcohol. It is highly recommended by medical, scientific and sociological workers who have seen the effects of the beverage as heretofore manufactured in the countries where the plant is native.

In preparing the beverage according to the present invention, approximately one pound of the roasted leaves is used in from fifteen to twenty gallons of water. The leaves are steeped in water for from five to fifteen minutes at a temperature of from 150° F. to 180°. The leaves are preferably steeped and not boiled, because boiling would destroy some of the valuable properties of the beverage, but the beverage secured by steeping without boiling is believed to be preferable. The proportion of leaves and water will vary according to the grade of the leaves. The liquid thus prepared is about the color of ordinary tea or light beer. After the infusion or brew has been made in this way it is filtered and allowed to cool. It is then passed through a vacuum chamber and all of the air, usually about two per cent by volume, is removed. From the vacuum chamber the liquid is transferred to the carbonator without again exposing it to air and in the carbonator it is charged with carbonic acid ($CO_2$) gas. It is then filled into bottles by means of an automatic bottling machine which automatically puts a predetermined amount of flavoring syrup into each bottle, usually about one ounce of flavoring syrup is added to about eight ounces of the infusion. The bottles are hermetically sealed without exposing the beverage to the atmosphere. It is desirable that the beverage shall be charged with carbonic acid gas unmixed with air as this gas will assist in preserving the beverage indefinitely where there is no air present. The infusion or brew from the yerba maté when not carbonated will spoil and for this reason it has always been necessary heretofore to prepare a fresh brew each time the drink is desired. By removing the air and bottling the beverage under pressure no aerobic germination can take place in the bottled beverage. The carbonic acid gas is an aid to preservation and at the same time gives the drink a delightful sparkle, besides being an aid to digestion. The beverage in bottles will keep indefinitely in any climate. The beverage may, of course, be bottled without sugar or flavor and in this form it is especially useful for persons suffering from diabetes.

Some people may prefer to drink the beverage hot and where such is the case the bottle can be opened and placed in hot water or the beverage can be poured from the bottle into a kettle and heated.

Although a syrup may be prepared from an extract of the maté leaves, it has been found that a beverage prepared from such syrup, although resembling the infusion prepared fresh from the leaves in some respects, does not possess the qualities of the freshly brewed drink. The only way at present known by which these qualities can be secured is by steeping the roasted leaves in water and heretofore it has been impossible to preserve a beverage so prepared from the maté plant, without the use of added preservatives. By removing the air from the infusion and charging the liquid with carbonic acid gas and sealing it in containers from which air is excluded, it has been discovered that all of the desirable qualities of the freshly brewed beverage are retained and in addition the presence of the carbonic acid gas renders the beverage more attractive and acceptable to North American users, especially when the beverage is supplied with a flavoring syrup.

I claim:—

1. The process of preparing a beverage from maté leaves wherein the leaves are steeped in water to form an infusion, after which the infusion is freed from air, carbonated, and sealed in a closed container.

2. The process of preparing a beverage from the maté plant wherein the leaves of the plant are steeped in hot water, after which the infusion is cooled, freed from air, carbonated, and sealed in closed containers.

3. A new carbonated beverage comprising a sealed and de-aerated extract of maté.

In testimony whereof I have signed my name to this specification on this 19th day of August, A. D. 1925.

CARL HORIX.